United States Patent
Shih

(10) Patent No.: US 9,608,920 B2
(45) Date of Patent: Mar. 28, 2017

(54) NETWORK INFORMATION EXTRACTING SYSTEM AND METHOD THEREOF

(71) Applicant: AIRCOM PACIFIC INC., San Jose, CA (US)

(72) Inventor: Daniel Shih, Dublin, CA (US)

(73) Assignee: Aircom Pacific Inc., Fremont, CA (US)

( * ) Notice: Subject to any disclaimer, the term of this patent is extended or adjusted under 35 U.S.C. 154(b) by 73 days.

(21) Appl. No.: 14/850,969

(22) Filed: Sep. 11, 2015

(65) Prior Publication Data

US 2016/0248687 A1 Aug. 25, 2016

(30) Foreign Application Priority Data

Feb. 26, 2015 (TW) ............................. 104106420 A

(51) Int. Cl.
| | |
|---|---|
| H04L 12/851 | (2013.01) |
| H04L 12/741 | (2013.01) |
| H04L 12/14 | (2006.01) |
| H04L 12/24 | (2006.01) |
| H04L 12/58 | (2006.01) |
| H04N 7/16 | (2011.01) |
| H04W 48/08 | (2009.01) |
| H04L 12/54 | (2013.01) |

(52) U.S. Cl.
CPC ...... *H04L 47/2483* (2013.01); *H04L 12/1425* (2013.01); *H04L 12/1453* (2013.01); *H04L 12/5692* (2013.01); *H04L 41/0803* (2013.01); *H04L 41/0896* (2013.01); *H04L 45/745* (2013.01); *H04L 47/24* (2013.01); *H04L 51/063* (2013.01); *H04L 51/26* (2013.01); *H04N 7/162* (2013.01); *H04W 48/08* (2013.01)

(58) Field of Classification Search
None
See application file for complete search history.

(56) References Cited

U.S. PATENT DOCUMENTS

| | | | | |
|---|---|---|---|---|
| 2003/0229708 A1* | 12/2003 | Lie | ...................... | H04L 12/5693 709/230 |
| 2010/0217886 A1* | 8/2010 | Seren | ................... | G06N 99/005 709/231 |
| 2014/0355523 A1* | 12/2014 | Congdon | .............. | H04W 48/12 370/328 |
| 2016/0080220 A1* | 3/2016 | Winningham | ...... | H04L 65/1076 370/352 |

* cited by examiner

*Primary Examiner* — Brian Roberts
(74) *Attorney, Agent, or Firm* — Anna Tsang

(57) ABSTRACT

A network information extracting system and method thereof are disclosed. A network message packet transmitted from a communications server is received by a router. The router includes a processor, a memory and a comparator. The processor disassembles the network message packet and extracts company information and a first message. The comparator compares the company information and a company list stored in the storage module. When the company information matches to one of the company lists, the first message is transmitted to a handheld device; when the company information does not match the list, a second message is added to the first message and transmitted to the handheld device.

10 Claims, 4 Drawing Sheets

NETWORK INFORMATION EXTRACTING SYSTEM AND METHOD THEREOF

BACKGROUND OF THE INVENTION

1. Field of the Invention

The present invention relates to a network information extracting system and method thereof, in particular to a network information extracting system and method thereof through disassembling the network message packet by the router.

2. Description of the Related Art

The communication software is installed in the handheld device by the application program, such as LINE, Whatsapp, Skype, viber and other communication application programs installed in smart phones, tablet computers and notebook computers. As long as the handheld devices can be connected to the internet, users may send text messages to each other via the servers of these communications software. But in the case of necessary restriction for the network environment, for example, the limited amount of data in network transmission, or when the rate of data flow is controlled, the transmission of these message packets must be limited.

In the past, when the rate of data flow was monitored, all data flow was blocked comprehensively, or only fixed bandwidth was provided for data transmission, but for users, either the network being unable to use or low speed of data transmission resulted in a bad impression of using experience. Therefore, in order to solve the above problem, directing to the features of communications software transmitting message packets, how to design to provide a complete transmission bandwidth in connection with some users or some software companies, and block a part of usage amount to achieve the effect of controlling the data flow, is a key point of the main development.

Based on the aforementioned situation, the inventor of the present invention has researched for years with painstaking effort to create and design a network information extracting system and method thereof, in order to further improve the deficiency directed to the current art, and thus enhance the implementation in the industry.

SUMMARY OF THE INVENTION

In view of the above problems of the conventional techniques, the purpose of the present invention is to provide a network information extracting system and method thereof to solve problems caused by the bandwidth restriction of network and the controlling of the data flow.

According to the purpose of the present invention, a network information extracting system is provided. The network information extracting system includes a router and a handheld device. Wherein a router receives a network message packet transmitted from a communication server. The router includes a processor, a memory and a comparator, which are disposed in the router. The processor disassembles the network message packet and extracts company information and a first message of the network message. The first message is message content of the network message packet. The memory stores a pre-established company list. The company list includes a plurality of company identifications. The comparator compares whether the company information is included in the plurality of company identifications of the company list. If so, the first message is not changed. If not, a second message is added to the first message. The second message is a network operating instruction. The handheld device is connected to the router via a network connector.

According to the result of comparison of the comparator, if the company information is included in the company list, the handheld device receives the first message. If the company information is not included in the company list, the handheld device receives the first message and the second message at the same time.

Preferably, if the company information is included in the company list, a reply message packet may be established after the handheld device receiving the first message and sent back to the communication server via the router.

Preferably, if the company information is not included in the company list, a reply message packet may still be established after the handheld device receiving the first message and the second message at the same time. The reply message packet is blocked by the router and cannot be sent back to the communication server directly.

Preferably, the router may transmit a third message to the handheld device at the same time. The third message includes a payment operating instruction.

Preferably, if the company information is not included in the company list, the router may transmit a fourth message to the communication server automatically. The fourth message is a joining instruction which notifies the companies how to join the company list.

According to another purpose of the present invention, a network information extracting method is provided. The network information extracting method includes the following steps: receiving a network message packet transmitted from a communication server by disposing a router; extracting company information and a first message of the network message through disassembling the network message packet by a processor, the first message is message content of the network message packet; pre-establishing a company list and storing in a memory, the company list includes a plurality of company identifications; comparing whether the company information is included in the plurality of company identifications of the company list through a comparison module, if so, the first message is transmitted to a handheld device directly, if not, a second message is added to the first message and then transmitted to the handheld device.

According to the above, the network information extracting system and method thereof of the present invention may have one or more advantages as follows:

(1) The network information extracting system and method thereof can restrict the transmission function of messages of a part of the communication software to reduce the amount of data transmission, such that the use of network bandwidth can be more effective.

(2) The network information extracting system and method thereof can extract message content from network, such that after users receiving the messages, the uses can decide whether to pay for the use of the bandwidth of the network transmission based on their replies of demand, or the bandwidth of the network transmission is provided through the cooperation of companies, so as to get control of the cost of network transmission more readily.

DETAILED DESCRIPTION OF THE PREFERRED EMBODIMENTS

In order to facilitate the understanding of the features, the contents and the advantages of the present invention, and the effectiveness thereof that can be achieved, the present invention will be illustrated in detail below through embodiments with reference to the accompanying drawings. On the other hand, the diagrams used herein are merely intended to be schematic and auxiliary to the specification, but are not necessary to be true scale and precise configuration after implementing the present invention. Thus, it should not be interpreted in accordance with the scale and the configuration of the accompanying drawings to limit the scope of the present invention on the practical implementation.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
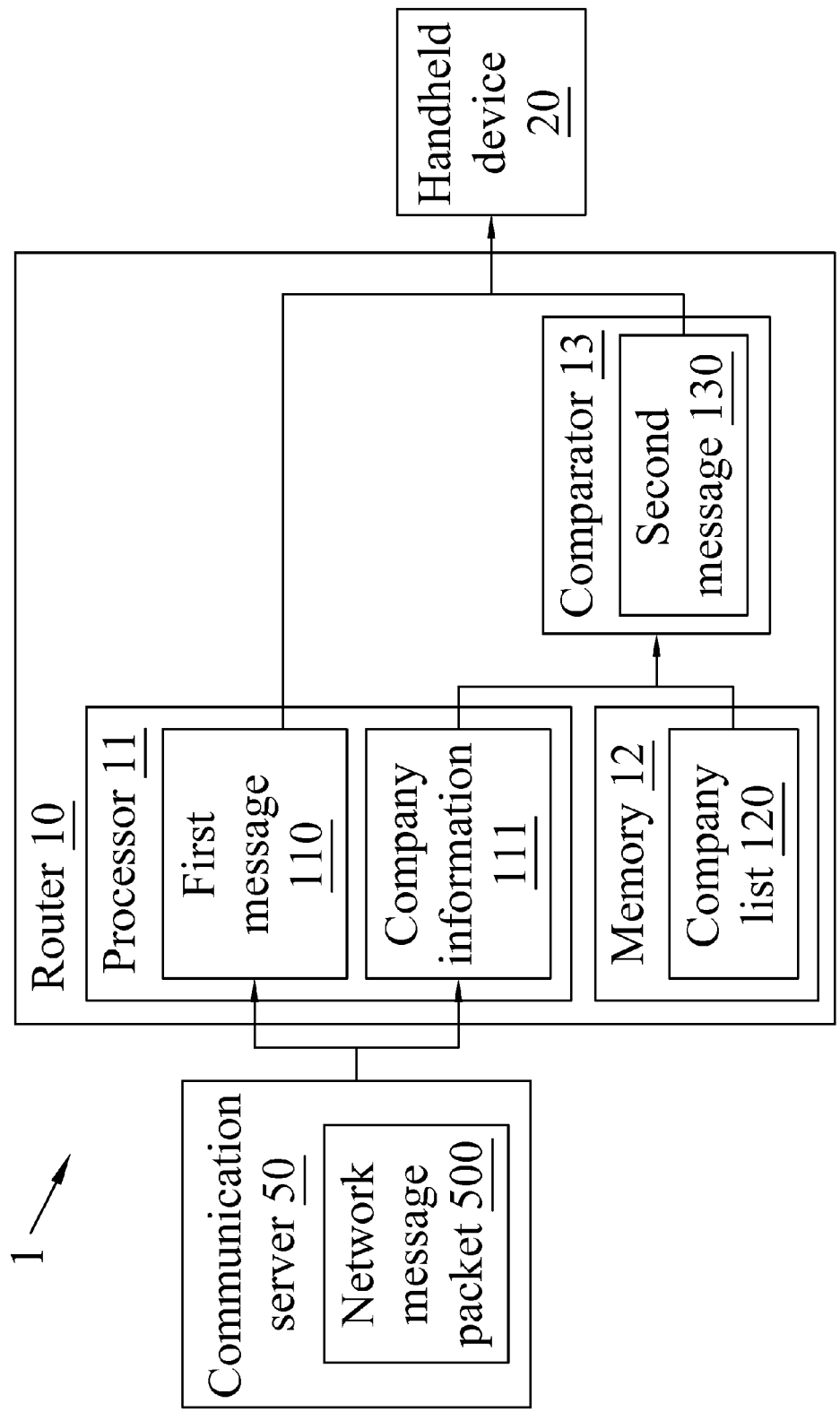
FIG. 1 is a block diagram of a network information extracting system of the present invention.

Please refer to FIG. 1, which is a block diagram of a network information extracting system of the present invention. In the figure, a router 10 of a network information extracting system 1 receives a network message packet 500 transmitted from a communication server 50 and transmits it to a handheld device 20 after processing. The router 10 may be a wireless network router or a cable network router depending on the location and the situation, for example, the wireless network connection provided on the aircraft may use the wireless network router; the network connection provided in the general office may use the cable network router. The router 10 includes a processor 11, a memory 12 and a comparator 13. The network information extracting system 1 may be a small embedded type system. The processor 11 may include a microcontroller or a central processor. The memory 12 may be a random access memory. The comparator 13 may be a chip which performs comparing function. When the processor 11 receives the network message packet 500 in the router 10, the packet is resolved and the message which includes the position of its source, the position of transmission, the message content and the description of the packet etc. wrapped by the packet is disassembled. The processor 11 searches for the message content of the network message packet 500 to set as a first message 110 in connection with the information in the packet. The first message 110 may be a text message which is the message content to be transmitted by the packet. The processor 11 may identify the application program used by the packet and may further judge which the manufacturer of the application program is as the company information 111 in connection with the position of source or the description of the packet at the same time. The company information 111 is obtained and compared by the comparator 13. The criteria of comparison are based on a company list 120 pre-established in the memory 12. The company list 120 includes names or codes of cooperation companies. Each company has its corresponding identification. The company information 111 obtained by the processor 11 is compared to see whether the company information 111 is shown on the company list 120, and then to identify whether the companies which transmit messages are cooperation companies.

The result which is obtained through comparing by the comparator 13, if the company information 111 is found in the company list 120, then the transmission bandwidth of the router 10 is allowed to be used. Therefore, the first message 110 is transmitted to the user's handheld device 20 without modification. Here, the handheld devices may be smart phones, tablet computers or notebook computers, but the present invention is not limited thereto, any devices with cable or wireless network transmission function and available for the installation of the communication application program are included in the present invention. However, if the company information 111 is not found in the company list 120, the comparator 13 then adds the second message 130 to the original network message packet 500, thus the first message 110 and the second message 130 are transmitted to the handheld device 20. Here, the added second message 130 is an instruction for use of network, which includes the reminders to the users "Some restrictions on the use of this application program" or "This application program is for reading message only."

Figure 2:
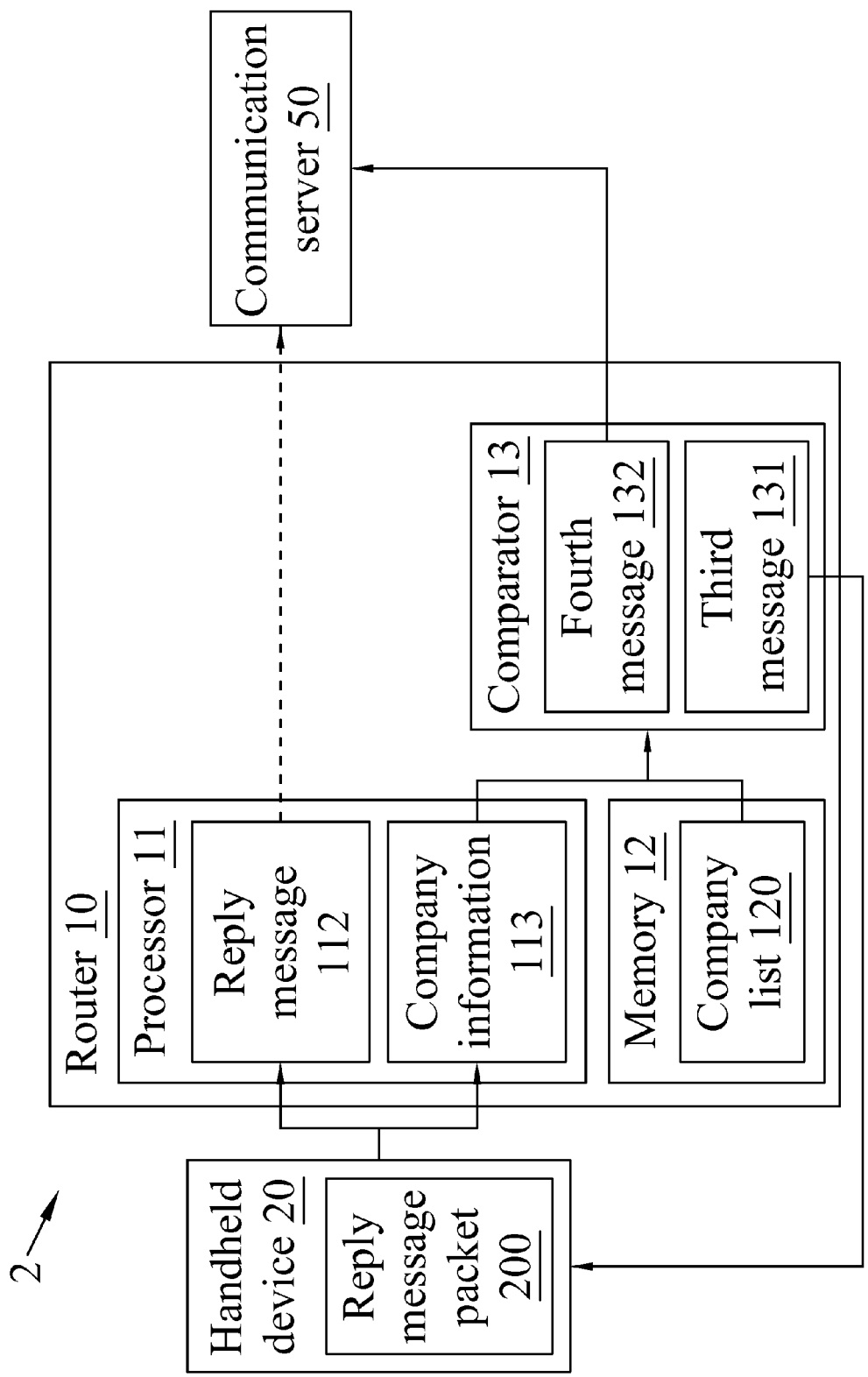
FIG. 2 is a block diagram of another network information extracting system of the present invention.

Please refer to FIG. 2, which is a block diagram of another network information extracting system of the present invention. In the figure, a router 10 of a network information extracting system 2 receives a reply message packet 200 transmitted from the handheld device 20 and transmits it to a communication server 50 after processing. The router 10 also includes a processor 11, a memory 12 and a comparator 13. When the processor 11 receives the reply message packet 200 in the router 10, the packet is resolved to extract a reply message 112 and company information 113. The mode of operation thereof is as same as the previous embodiment. The company information 113 obtained is compared with a company list 120 pre-established in the memory 12 by the comparator 13. If the company information 113 is shown on the company list 120, the companies which transmit messages are identified as cooperation companies. Here, although the comparison is carried out in connection with the reply message packet 200, as described in the previous embodiment, if the network message packet received by the handheld device 20 is transmitted by the cooperation company, the reply message packet 200 established by the handheld device 20 may also be directly sent back to the communications server 50 via the router 10 without disassembling and comparing again.

As shown in FIG. 2, if the company information 113 of the reply message packet 200 is not found in the company list 120, the processor 11 prevents the reply message packet 200 from uploading. Meanwhile, the comparator 13 may return a third message 131 to the handheld device 20. The third message 131 not only informs the users of the unavailable message transmission function, but also informs the users who intend to use the entire message transmission function of the way of use after payment through the hyperlinks added for payment. In addition, the comparator 13 may also transmit a fourth message 132 to the communications server 50. The fourth message 132 is a message which informs the companies of the method for joining or cooperation. The companies may join the company list 120 by way of sponsorship or payment, such that the users who use this company communication services may transmit message packets unlimitedly via the router 10.

Figure 3:
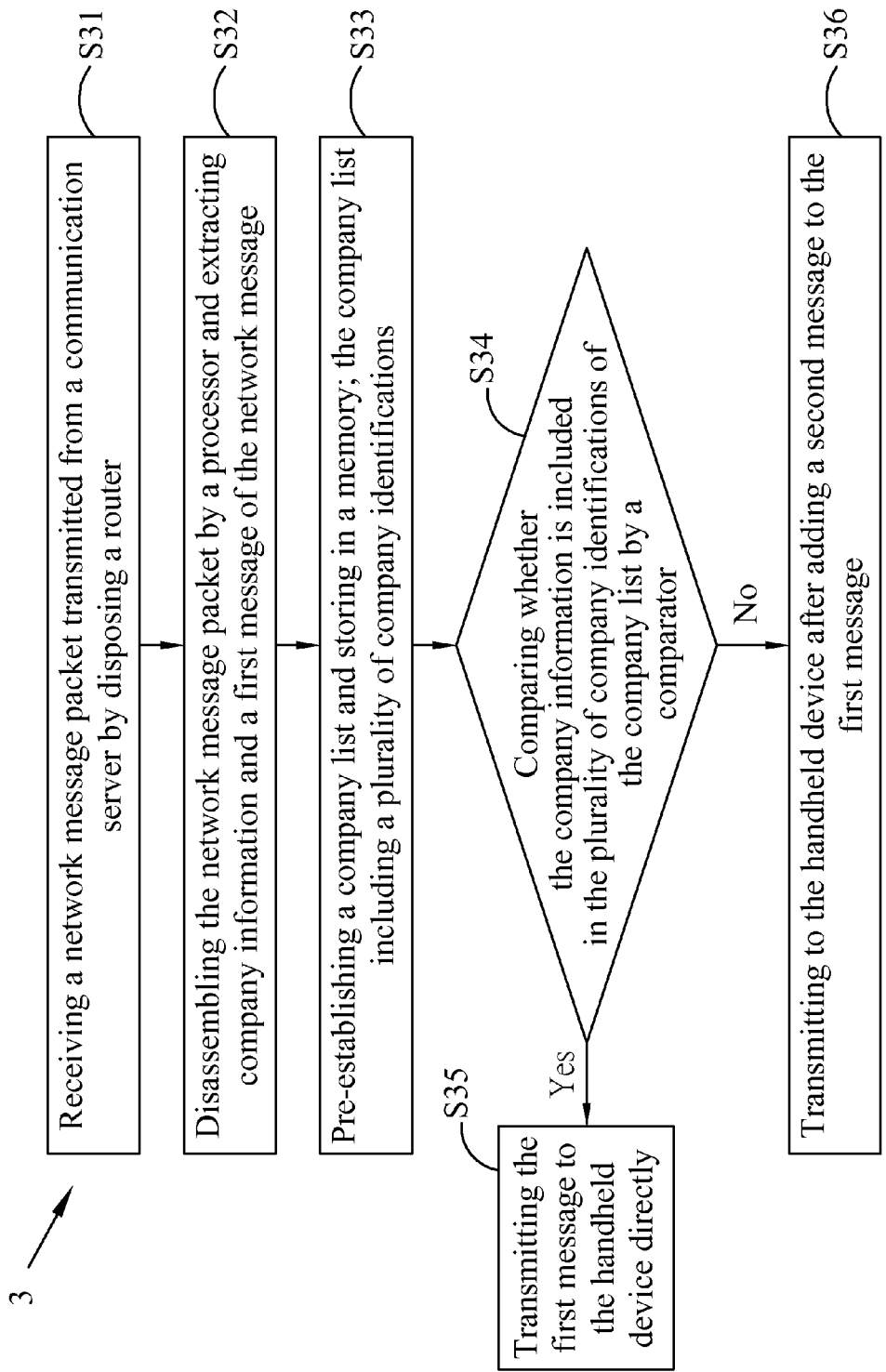
FIG. 3 is a flow chart of a network information extracting method of the present invention.

Please refer to FIG. 3, which is a flow chart of a network information extracting method of the present invention. In FIG. 3, the workflow of the network information extracting method 3 includes the following steps: S31: Receiving a network message packet transmitted from a communication server by disposing a router; S32: Disassembling the network message packet by a processor and extracting company information and a first message of the network message; S33: Pre-establishing a company list and storing in a memory; the company list including a plurality of company identifications; S34: Comparing whether the company information is included in the plurality of company identifications of the company list by a comparator; if so, then S35: Transmitting the first message to the handheld device directly; if not, then S36: Transmitting to the handheld device after adding a second message to the first message.

In the workflow of extracting network information described above, after the communications server receives the message sent by the user, the message is integrated to a network message packet and transmitted to the network address of transmission target through the network. But if the network environment is under restriction during the transmission, such as wireless network bandwidth and data flow on the aircraft are limited, the use of communications software in the office hours monitored by the enterprises etc., the message packet is then required to be further disassembled and processed in order to control the data flow. For example, the aircraft makes use of communication satellite to realize wireless network environment. However, the data flow and the bandwidth thereof are not as good as the one on the ground, and the cost is much higher. Therefore, the wireless network service on offer is necessary to be restricted. The router for the wireless network on the aircraft may provide a complete transmission service in connection with the particular companies, and the cost of satellite transmission may be shared through the partnerships between the companies. The practices are same as the steps described above: further disassembling the network message packet; extracting the company information representing the company; setting the message content as the first message; and deciding whether to provide a complete transmission environment after comparing the company information with the specific company list. If the company is one of the cooperation companies, the first message is transmitted directly to the user's handheld device; if the company is not one of the cooperation companies, then a second message is added to explain the restrictions of use for this communication software.

Figure 4:
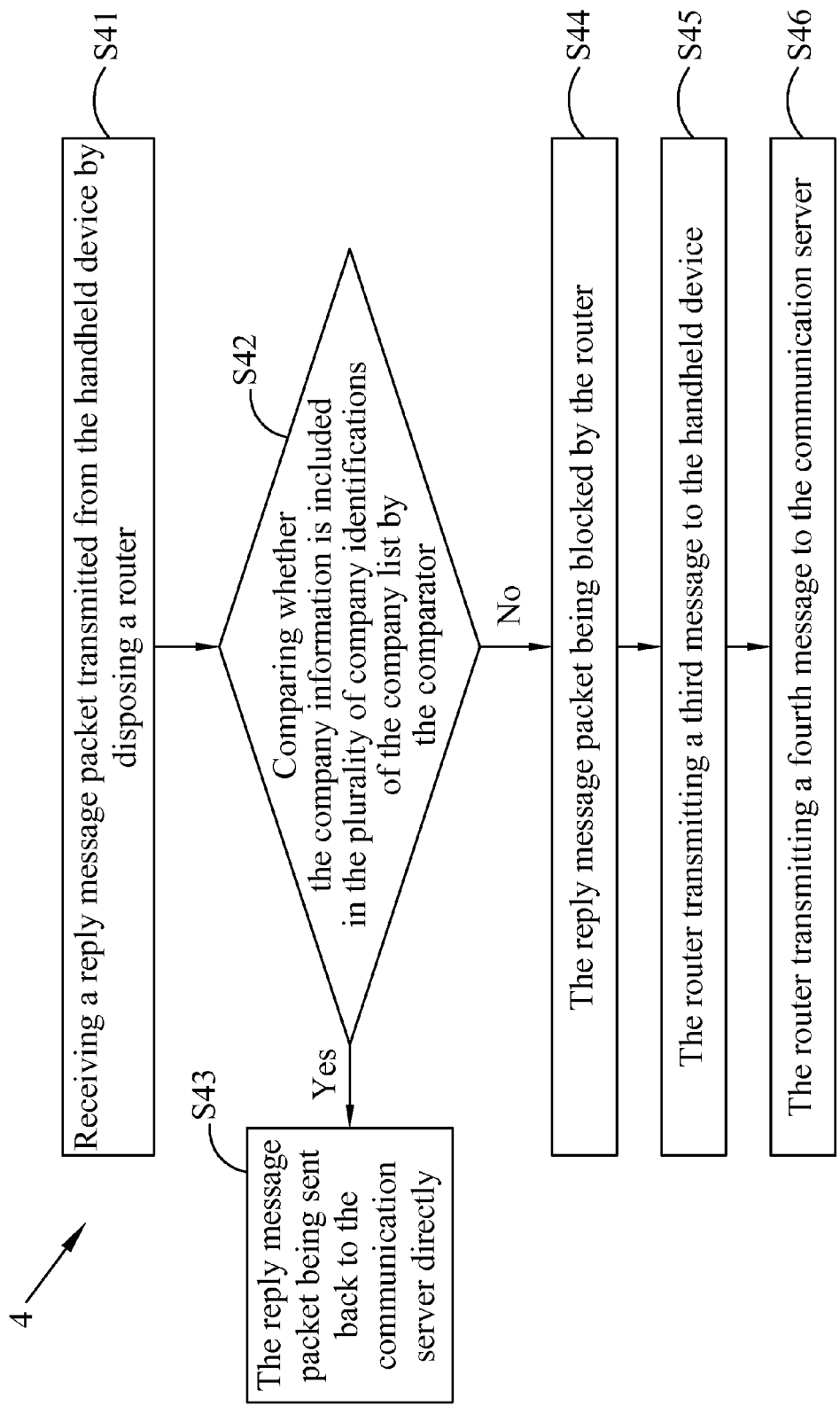
FIG. 4 is a flow chart of another network information extracting method of the present invention.

Please refer to FIG. 4, which is a flow chart of another network information extracting method of the present invention. The workflow of the network information extracting method 4 includes the following steps: S41: Receiving a reply message packet transmitted from the handheld device by disposing a router; S42: Comparing whether the company information is included in the plurality of company identifications of the company list by the comparator; if so, then S43: The reply message packet being sent back to the communication server directly; if not, then S44: The reply message packet being blocked by the router; S45: The router transmitting a third message to the handheld device; S46: The router transmitting a fourth message to the communication server.

In the workflow of another network information extracting method described above, after the handheld device receives message transmitted from the router, a reply message may be written and transmitted after establishing a reply message packet by the application program of the handheld device. Since the reply message packet is transmitted through the router, there is the same problem related to bandwidth and data flow, thus the comparator also compares whether the communication software company adopted by the user is one of the cooperation partners in the company list. If the company is one of the cooperation companies, the message packet may be sent back directly to the communications server to carry out the reply of the message; if the company is not one of the cooperation companies, the transmission of the message packet is blocked, and the user is unable to reply the message through this communication software. In addition, the router may also transmit the relevant regulations of use to the users, such that the users understand that payment is necessary for use if the network functions are under restriction. At the same time, the messages of invitation for cooperation are also transmitted to the communication server, such that the users may use the function of transmitting network message without restriction in the environment of this router transmission after the companies join the company list.

The above description is only illustrative, but is not restrictive. Any disclosures without departing from the spirit and scope of the present invention and its equivalent modifications or changes, should be enclosed within the scope of the appended claims.

What is claimed is:

1. A network information extracting system, comprising:
a router, receiving a network message packet transmitted from a communication server, the router comprising:
a processor, disposed in the router, the processor disassembling the network message packet, extracting company information and a first message of the network message, the first message being message content of the network message packet;
a memory, disposed in the router, storing a pre-established company list, the company list comprising a plurality of company identifications; and
a comparator, disposed in the router, comparing whether the company information is included in the plurality of company identifications of the company list, if so, the first message is not changed, if not, a second message is added to the first message, the second message being a network operating instruction; and
a handheld device, connected to the router via a network connector, according to a result of comparison of the comparator, if the company information is included in the company list, the handheld device receives the first message, if the company information is not included in the company list, the handheld device receives the first message and the second message at the same time.

2. The network information extracting system of claim 1, wherein if the company information is included in the company list, a reply message packet is established after the handheld device receiving the first message and is sent back to the communication server via the router.

3. The network information extracting system of claim 1, wherein if the company information is not included in the company list, a reply message packet is established after the handheld device receiving the first message and the second message at the same time, the reply message packet is blocked by the router and cannot be sent back to the communication server directly.

4. The network information extracting system of claim 3, wherein the router transmits a third message to the handheld device at the same time, the third message comprises a payment operating instruction.

5. The network information extracting system of claim 1, wherein if the company information is not included in the company list, the router transmits a fourth message to the communication server automatically, the fourth message being a joining instruction which notifies the companies how to join the company list.

6. A network information extracting method, comprising the following steps:
  receiving a network message packet transmitted from a communication server by disposing a router;
  extracting company information and a first message of the network message through disassembling the network message packet by a processor, the first message being message content of the network message packet;
  pre-establishing a company list and storing in a memory, the company list comprising a plurality of company identifications;
  comparing whether the company information is included in the plurality of company identifications of the company list through a comparator, if so, the first message is transmitted to a handheld device directly, if not, a second message is added to the first message and then transmitted to the handheld device.

7. The network information extracting method of claim 6, wherein if the company information is included in the company list, after the handheld device receiving the first message, further comprising the following steps:
  establishing a reply message packet and the reply message packet being sent back to the communication server via the router.

8. The network information extracting method of claim 6, wherein if the company information is not included in the company list, after the handheld device receiving the first message and the second message at the same time, further comprising the following steps:
  establishing a reply message packet and the reply message packet being blocked by the router and cannot be sent back to the communication server directly.

9. The network information extracting method of claim 8, wherein the router transmits a third message to the handheld device at the same time, the third message comprises a payment operating instruction.

10. The network information extracting method of claim 6, wherein if the company information is included in the company list, the router transmits a fourth message to the communication server automatically, the fourth message being a joining instruction which notifies the companies how to join the company list.

\* \* \* \* \*